United States Patent

Lewis

[11] 4,054,323
[45] Oct. 18, 1977

[54] HUB CAP LOCKING DEVICE
[76] Inventor: Edson Lewis, 383 Sumner Ave., Brooklyn, N.Y. 11221
[21] Appl. No.: 731,919
[22] Filed: Oct. 13, 1976
[51] Int. Cl.² ............................................. B60B 7/06
[52] U.S. Cl. ............................ 301/37 AT; 301/37 R; 301/37 TP; 301/108 R
[58] Field of Search ............. 301/37 R, 37 AT, 37 C, 301/37 TP, 35 BJ, 11 CD, 63 DT, 63 DS, 108 R; 403/349, 348, 316, 319; 70/169, 259

[56] References Cited
U.S. PATENT DOCUMENTS

| | | | |
|---|---|---|---|
| 2,291,597 | 8/1942 | Goeske | 301/37 AT |
| 2,453,746 | 11/1948 | Duvall, Jr. | 301/37 AT X |
| 2,553,891 | 5/1951 | Brosick | 301/37 R X |

Primary Examiner—Robert B. Reeves
Assistant Examiner—Charles A. Marmor
Attorney, Agent, or Firm—Allen D. Brufsky

[57] ABSTRACT

A plurality of L-shaped brackets spaced about the inner circumference of a hubcap have a slot for receiving one of a plurality of L-shaped lugs projecting outwardly from the exterior surface of a wheel to prevent the hubcap from being pryed from the wheel. A lock on the hubcap has a reciprocable projection received within a rectangular slot on one of the wheel lugs to preclude relative rotation of the hubcap and wheel.

5 Claims, 2 Drawing Figures

HUB CAP LOCKING DEVICE

BACKGROUND OF THE INVENTION

This invention relates to a novel arrangement for locking a hubcap to a vehicle wheel.

Many vehicle wheels have hubcaps which have substantially the same diameter as the wheel and are mounted by clips over the beaded rim of the wheel. A screwdriver inserted between the clip and rim can be used to pry the hubcap from the wheel. Further, such hubcaps are difficult to mount, requiring the use of a rubber mallet or the like to properly position the clip on the rim. Sometimes, the clip is not mounted tight on the rim resulting in loss of the hubcap during travel. Accordingly, this invention provides arrangement between a hubcap and a vehicle wheel for mounting the hubcap on the wheel simply by pressing the hubcap to the exterior wheel surface and twisting the hubcap. The mounting arrangement is desinged to lock the hubcap in place to prevent unauthorized removal by prying it loose and to prevent accidental loss during vehicle movement.

SUMMARY OF THE INVENTION

In accordance with the invention, the vehicle wheel is provided with a plurality of integral L-shaped lugs facing in the same direction around the circumference of the wheel. The hubcap is provided with complemental L-shaped brackets all facing in the same direction about the circumference of the inner surface of the hubcap. Each L-shaped bracket includes a slot which is aligned with an L-shaped lug on the wheel and receives the lug therethrough upon rotation of the hubcap relative to the wheel. The horizontal leg of each lug overlies the horizontal leg of its mated bracket precluding the hubcap from being pryed or accidentally removed from the wheel. A lock on the hubcap has a projection which is reciprocably received within a slot in one of the lugs on the wheel after the hubcap is mounted to prevent it from being rotated to disengage the mated lugs and brackets unless the lock is opened.

BRIEF DESCRIPTION OF THE DRAWING

Further objects and advantages of the invention will become apparent from the following description and claims and from the accompanying drawing, wherein:

DETAILED DESCRIPTION OF THE PREFERRED EMBODIMENT

Figure 1:
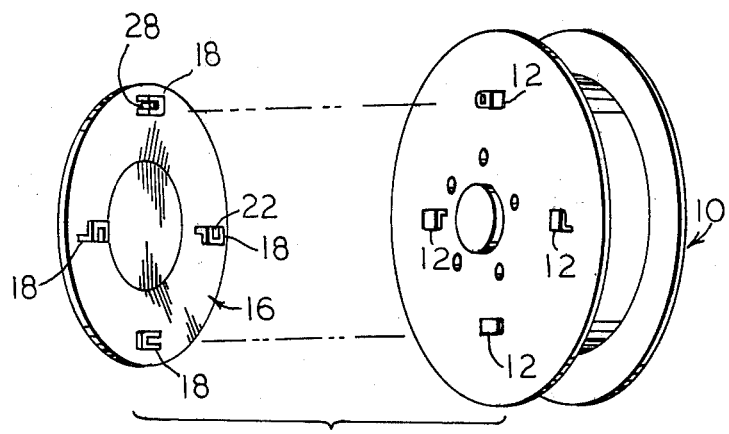
FIG. 1 is an exploded perspective view of a hubcap and wheel provided with a locking arrangement in accordance with the present invention.
Figure 2:
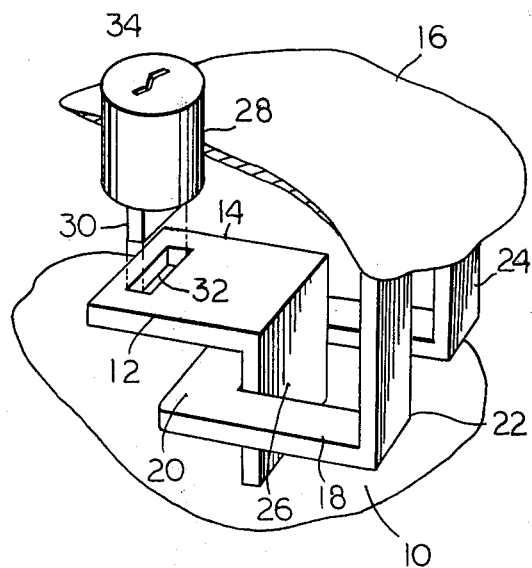
FIG. 2 is an enlarged perspective view of a portion of the locked hubcap and wheel of FIG. 1.

Referring now to the drawing in detail, wherein like numerals indicate like elements throughout the several views, a vehicle wheel 10 is provided with a plurality of integral L-shaped lugs 12 spaced about the exterior circumference of wheel 10. Each of the lugs 12 have horizontal legs 14 extending in the same direction, e.g., counterclockwise in FIG. 1, about the circumference of wheel 10.

A hubcap 16 is provided with complemental L-shaped brackets 18 having horizontal legs 20 all facing in the same direction about the interior circumference of hubcap 16, but in a clockwise direction which is reversed when placed on the exterior surface of the wheel 10 so that the horizontal legs 20 of the brackets 18 extend in the same direction as the horizontal legs 14 of the lugs 12. Each of the brackets 18 include an interior slot 22 and the vertical leg 24 of each bracket 18 is longer than the vertical leg 26 of each lug 12 so that slot 22 will receive therethrough a lug 12 upon rotation of hubcap 16 in a clockwise direction on the wheel 16 with the horizontal legs 14 of a lug 12 overlying the horizontal leg 20 of a bracket 18 precluding hubcap 16 from being pryed from the wheel 10.

A conventional lock 28 mounted on the rim of hubcap 16 has a projection 30 reciprocably received within a rectangular slot 32 in the horizontal leg 14 of one of lugs 12 upon rotation of the lock 28 by placing a key in a keyhole 34 on the exterior surface of the lock and rotating the tumbler mechanism of the lock. With projection 30 extended into slot 32 the hubcap 16 cannot be rotated relative to wheel 10 to remove the hubcap from the wheel.

While a specific embodiment of a hubcap locking device has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A hubcap locking arrangement for a vehicle wheel comprising:
   a vehicle wheel including a plurality of L-shaped lugs spaced about the exterior circumference of said wheel, each of said lugs having a horizontal leg extending in the same direction about the wheel circumference; and
   a hubcap including a plurality of L-shaped brackets spaced about the interior circumference of said hubcap, each of said brackets having a horizontal leg extending in the same direction about the hubcap circumference and in the same direction as the horizontal legs of said lugs when the interior circumference of said hubcap is facing the exterior circumference of said wheel, each of said brackets including a slot for receiving a lug on said wheel with the horizontal legs of said lug and said bracket overlying each other to preclude said hubcap from being pryed from said wheel.

2. The arrangement of claim 1, wherein the L-shaped brackets include a vertical leg which is longer than a vertical leg of said L-shaped lugs.

3. The arrangement of claim 2, wherein said slot in each of said brackets includes a portion in said vertical and horizontal leg.

4. The arrangement of claim 1 including lock means on said hubcap for preventing relative rotation of said hubcap and wheel.

5. The arrangement of claim 4, wherein said lock means include a lock having a reciprocable projection received within a rectangular slot in the horizontal leg of one of said wheel lugs.

* * * * *